Sept. 19, 1950     M. MANNE     2,522,954
COUPLING DEVICE FOR FINGER RINGS
Filed May 7, 1948
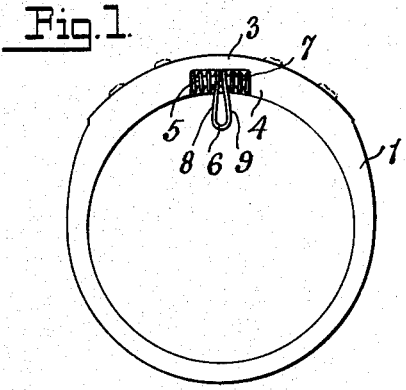
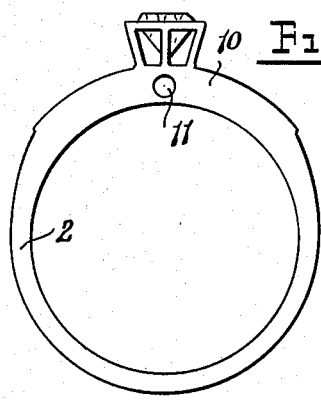
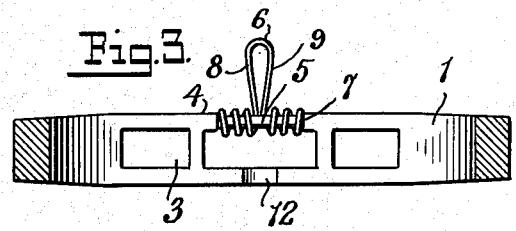
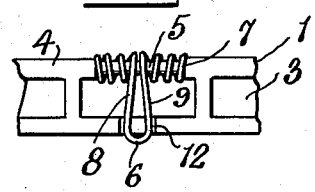
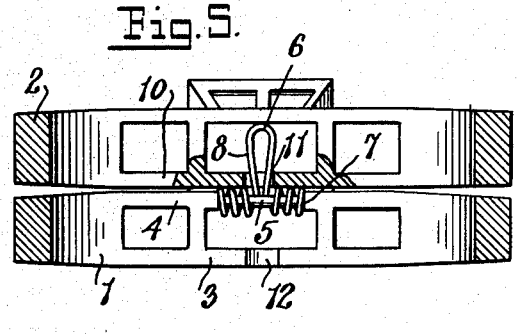
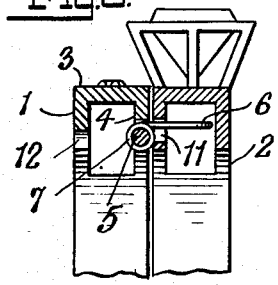
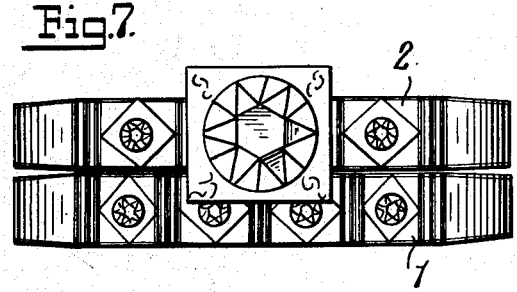
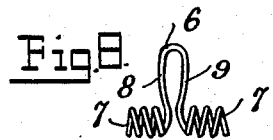
INVENTOR.
Moe Manne
BY Harry Radzinsky
Attorney Patented Sept. 19, 1950

2,522,954

UNITED STATES PATENT OFFICE 2,522,954

COUPLING DEVICE FOR FINGER RINGS

Moe Manne, New York, N. Y.

Application May 7, 1948, Serial No. 25,625

2 Claims. (Cl. 63—15)

This invention relates to finger rings, and more particularly to a means for coupling two finger rings together so that a rotative movement of one ring with respect to the other will be prevented.

It is found that when two rings are worn on the same finger, there is a tendency for one ring to rotate with respect to the other, so that the designs or setting portions of the two rings are misaligned and the appearance of the rings and the cooperativeness of the two designs of the same is destroyed. This is particularly true of those engagement and wedding rings which, when maintained in proper alignment are adapted to cooperate in the production of an attractive design.

Efforts have been made in the past to couple two rings together by providing interengaging or interfitting parts of the design on both rings, such arrangements not being satisfactory because special designs are required to provide the proper interfit of the parts. Thus, the designer found himself materially restricted in the development of new designs. Moreover, such rings required projecting edge parts which detracted from the appearance of a ring, particularly when the ring was worn alone or separated from its companion.

Having in mind the ineffectiveness of prior devices of this general character, the present invention contemplates the provision of a coupling means in which the cooperating parts which couple the two rings together interengage with a positive or so-called "snap" action, thereby firmly and securely connecting the two rings together in the desired close relationship required. The invention further contemplates the provision of a coupling means of this character which, when in an inoperative position, will be hidden and concealed and will not project to any material extent beyond the ring on which it is provided. Another object of the invention is to provide a coupling means of such a nature that the same will not readily get out of order; which can be easily adjusted to secure desired snap action with the cooperating portion of an adjacent ring and which can be readily repaired or replaced if breakage occurs.

These and other objects are attained by the invention, a more particular description of which will hereinafter appear and be set forth in the claims appended hereto.

In the accompanying drawings, wherein an illustrative embodiment of the invention is disclosed:

Fig. 1 is a face view of a ring provided with one of the elements of the coupling device;

Fig. 2 is a face view of a companion ring adapted to be coupled to the ring shown in Fig. 1;

Fig. 3 is a sectional view through the ring of Fig. 1, looking upwardly or at the under side of the ring top;

Fig. 4 is a view similar to Fig. 3, but showing the spring coupling member in its inoperative position;

Fig. 5 is a sectional view through two rings coupled together;

Fig. 6 is a transverse sectional view through the two coupled rings;

Fig. 7 is a top plan view of the two rings in coupled relation;

Fig. 8 is a view showing the spring coupling member, and

Fig. 9 shows a modified form of spring coupling member.

With reference to the drawing, I indicates one of the finger rings, and 2 the second ring adapted to be connected or coupled to the ring 1. The ring shown at 1 may be a wedding ring, while that shown at 2 may be an engagement ring, and the two rings may have similar design elements, so that when the rings are placed in juxtaposition and are coupled together, an attractive appearance is the result. The top of the ring 1 is indicated at 3, and the same includes a side wall 4 which is provided with a rod or pin 5 serving as a mounting for a pivotal resilient coupling member. Said coupling member consists of a springy and compressible loop portion 6 constituting a spring finger adapted to enter into snap engagement with a suitable aperture or orifice 11 provided in the side wall 10 of the engagement ring 2. The construction of the coupling member or spring finger 6 will be noted in Fig. 8 wherein it will be seen that the same includes an elongated loop having two similar legs 8 and 9, each of which is formed with laterally extended spiral or helix 7. The helices 7 fit around the pin or rod 5 which serves as a bearing therefor, permitting the loop or finger 6 to be either swung outwardly, with the pin 5 as its pivotal point, to the projected position of Fig. 3 or to the position shown in Fig. 4. In the position of Figs. 3 and 6, which is the operative position of the loop 6, the loop will project laterally of the wall 4 of the ring 1 and to such a position that when the ring 2 is placed closely adjacent to the ring 1, the loop 6 can be entered into the aperture 11 and the springy nature of the loop 6 enables it to enter the aperture 11 with a snap engagement. It will maintain such engagement indefinitely until the two rings are manually separated by the imposition of sufficient force to cause the loop 6 to be sprung out of the aperture 11.

The loop member 6, including the integrally formed helical portions 7 thereon, is preferably composed of a springy, non-corrosive metal which will maintain its tension under all conditions of use. Should the aperture 11 in the ring 2 become slightly enlarged by repeated insertion and removal of the loop member 6 so that the desired snap engagement of the loop member 6 with the aperture will not be obtained, it is a simple matter to spread or enlarge the loop member 6 by separation of the legs 8 and 9 slightly, such operation being readily performed by inserting a pointed and tapered implement within the loop.

From the foregoing, it will be apparent that the two rings 1 and 2 can be readily and securely connected or coupled together by placing them side-by-side either while on or off the finger, and applying force to cause the loop member 6 to snap into engagement with the aperture 11. This will retain the two rings together in very close coupled relationship as shown in Figs. 5, 6 and 7, so that any rotative movement of one ring with respect to its companion will be prevented, and the tops or design-bearing portions of the rings will thus be maintained in alignment and an attractive appearance presented. The springy nature of the coupling member or loop 6 enables a very positive attachment of one ring to the other to be secured; the resiliency of the loop member 6 is adjustable as heretofore pointed out and in a rare instance of breakage of the coupling member, the pin 5 can be readily removed, a new coupling member placed on it and the pin replaced.

In Fig. 8, the coupling member or loop 6 is shown as having its legs 8 and 9 in slightly spaced relation. In Fig. 9 a modification of this arrangement is shown, wherein the legs are crossed as at 14, the latter arrangement providing a greater degree of resiliency when an increased snap action between the loop member and the aperture 11 is desired. Either of the above arrangements may be used with satisfaction.

When the ring 1 is to be worn singly or perhaps in company with another ring not provided with the aperture 11 so that a coupling is not obtainable, the loop member 6 is inoperatively positioned as shown in Fig. 4. That is to say, the loop is pivotally swung on the pin 5, which is located to one side of the longitudinal center line of the ring so that the loop underlies the top 3 of the ring. The under surface of the ring 1 is provided with a recess 12 into which the loop will fit when in such retracted position, thus allowing the loop to lie flush with the inner surface of the ring so that it does not cause friction or irritation to the finger. When the loop is in this inoperative position most, if not all of it, is concealed by the top of ring 1 and the ring then presents the aspect of the conventional ring.

While I have shown and described one embodiment of the invention, it is obvious that the same is not to be limited thereto, since various modifications may be readily made without departing from the spirit of the invention. For example, while I have shown the resilient finger or loop 6 provided on the wedding ring and the receiving aperture 11 therefor on the engagement ring, these parts may be reversed and the finger or loop 6 may be provided on the engagement ring. Also while I have shown the aperture 11 provided in only one side wall of the ring 2, it will be apparent that it can be provided in both side walls of the ring. While only one resilient finger or loop 6 and only one aperture 11 therefore is shown in the rings, it will be obvious that plurality of these cooperating elements may be provided on the rings if it is found necessary or desirable.

In herein referring to the rings as "finger" rings, I do not mean to limit the present invention strictly to such articles, since it is apparent that the present invention is readily applicable to bracelets or other annular members, the coupling together which by the described means may be found necessary or desirable.

What I claim is:

1. A coupling device for finger rings comprising, a ring having a rod on its under side, a spring wire member spiralled about said rod and provided with a laterally-extending spring loop, said wire member being pivotal on the rod whereby the loop portion thereof can be swung to project beyond one edge of the ring, said wire member being adapted for insertion in an opening in a second ring when the loop is projecting beyond one edge of the first ring.

2. A coupling device for a pair of finger rings comprising, a ring having a rod portion extending along its under side, a spring loop having spiral portions coiled around the rod and constituting a pivotal mounting for the loop, the loop extending laterally from the spiral portions, the rod being located to one side of the longitudinal center line of the ring whereby the loop may be pivotally swung to project either out beyond one side of the ring or may be swung under the top of the ring and at least partially concealed thereby, the loop when extended out beyond one side of the ring being adapted for reception in an opening provided in a second ring.

MOE MANNE.

REFERENCES CITED

The following references are of record in the file of this patent:

UNITED STATES PATENTS

| Number | Name | Date |
| --- | --- | --- |
| 2,056,691 | Richardson | Oct. 6, 1936 |
| 2,127,766 | Coleman | Aug. 23, 1938 |
| 2,275,553 | Place | Mar. 10, 1942 |
| 2,439,727 | Granat | Apr. 13, 1948 |